(12) United States Patent
Nishi et al.

(10) Patent No.: US 7,443,670 B2
(45) Date of Patent: Oct. 28, 2008

(54) SYSTEMS FOR IMPROVED BLOWER FANS

(75) Inventors: Yoshifumi Nishi, Ibaraki (JP); Masahiro Kuroda, Ibaraki (JP); Sridhar V. Machiroutu, Santa Clara, CA (US); Himanshu Pokharna, San Jose, CA (US); Karen Stafford, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 11/030,930

(22) Filed: Jan. 7, 2005

(65) Prior Publication Data

US 2006/0152900 A1    Jul. 13, 2006

(51) Int. Cl.
*H05K 7/20* (2006.01)

(52) U.S. Cl. ............ 361/695; 415/211.2; 417/423.7; 165/121

(58) Field of Classification Search .......... 361/695, 361/690, 697; 415/177, 211.2–211.3, 121.2, 415/116, 175, 178, 220, 185–186, 208.2–208.3, 415/191; 417/423.14; 165/80.3, 121–122, 165/185
See application file for complete search history.

(56) References Cited

U.S. PATENT DOCUMENTS

| | | | | |
|---|---|---|---|---|
| 3,794,439 | A | | 2/1974 | Haase |
| 4,219,307 | A | * | 8/1980 | Bergdahl ............... 415/220 |
| 4,963,076 | A | * | 10/1990 | Fleischmann et al. .... 417/423.7 |
| 5,803,721 | A | * | 9/1998 | Lee ..................... 417/423.14 |
| 6,050,774 | A | * | 4/2000 | LeBaron ............... 415/121.2 |
| 6,132,182 | A | * | 10/2000 | Khan et al. ............... 417/354 |
| 6,280,317 | B1 | * | 8/2001 | Przilas et al. ............ 454/184 |
| 6,311,767 | B1 | * | 11/2001 | Inoue et al. ............. 165/80.4 |
| 6,315,031 | B1 | * | 11/2001 | Miyahara et al. ......... 165/80.3 |
| 6,416,300 | B1 | * | 7/2002 | Tang et al. ............ 417/423.12 |
| 6,472,781 | B2 | * | 10/2002 | Yamamoto ................ 310/58 |
| 6,508,621 | B1 | * | 1/2003 | Zeighami et al. .......... 415/119 |
| 6,554,697 | B1 | * | 4/2003 | Koplin ................... 454/184 |
| 6,604,906 | B2 | | 8/2003 | Ozeki et al. |
| 6,654,247 | B1 | * | 11/2003 | Lee ...................... 361/697 |
| 6,781,835 | B2 | * | 8/2004 | Hashimoto et al. ....... 361/697 |
| 6,817,941 | B1 | * | 11/2004 | Gatov ................... 454/187 |
| 6,860,323 | B2 | * | 3/2005 | Cheng .................... 165/121 |
| 2002/0119044 | A1 | | 8/2002 | O'Connor, Jr. et al. |
| 2003/0000684 | A1 | | 1/2003 | Huang et al. |
| 2003/0002254 | A1 | * | 1/2003 | Faneuf et al. ............ 361/687 |

(Continued)

OTHER PUBLICATIONS

"PCT International Search Report of the International Searching Authority", mailed Sep. 4, 2006, for PCT/US2006/000751, 5 pgs.

*Primary Examiner*—Jayprakash N Gandhi
*Assistant Examiner*—Courtney L Smith
(74) *Attorney, Agent, or Firm*—Buckley, Maschoff & Talwalkar LLC (57) ABSTRACT

According to some embodiments, systems for improved blower fans are provided. In some embodiments, systems may include a casing comprising an inlet to accept a fluid and an outlet to evacuate the fluid. The systems may further comprise an impeller disposed within the casing, comprising a hub and one or more impeller blades coupled to the hub. In some embodiments, the inlet of the casing may be shaped to reduce the amount of fluid that evacuates the casing via the inlet due to pressure within the casing.

13 Claims, 7 Drawing Sheets

U.S. PATENT DOCUMENTS

| | | |
|---|---|---|
| 2003/0015311 A1 | 1/2003 | Lin et al. |
| 2003/0202877 A1 | 10/2003 | Kamiya et al. |
| 2005/0103480 A1* | 5/2005 | Pokharna et al. ............ 165/122 |
| 2005/0145366 A1* | 7/2005 | Erel ........................... 165/80.3 |
| 2005/0186070 A1* | 8/2005 | Zeng ....................... 415/211.2 |
| 2006/0188370 A1* | 8/2006 | Chen .......................... 415/220 |

* cited by examiner

SYSTEMS FOR IMPROVED BLOWER FANS

BACKGROUND

Fans are often used to facilitate the removal of heat from electronic devices. In some applications, such as where space is limited (e.g., in notebook computers), blower fans are used to direct air within and/or from the electronic devices. As electronic devices continue to produce larger quantities of heat that must be removed, the efficiency of the blower fan becomes increasingly important. Blower fans, however, often expel a certain quantity of air into the stream of inlet air, disrupting the flow of the air entering the blower fan. This blowback effect reduces the efficiency of the blower fan.

DETAILED DESCRIPTION

Figure 1:
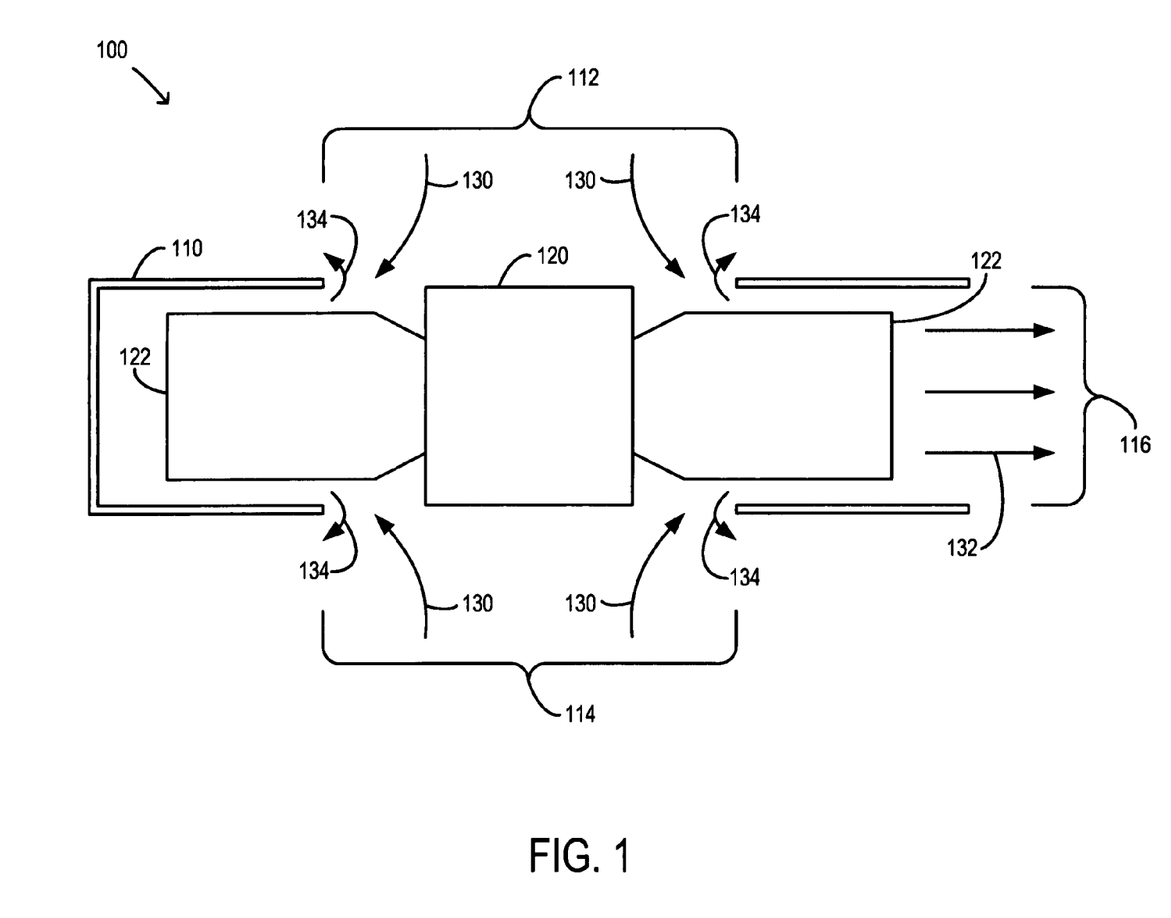
FIG. 1 is a cross-sectional diagram of a system.

Referring first to FIG. 1, a cross-sectional diagram of a system 100 is shown. The various systems described herein are depicted for use in explanation, but not limitation, of described embodiments. Different types, layouts, quantities, and configurations of any of the systems described herein may be used without deviating from the scope of some embodiments. Fewer or more components than are shown in relation to the systems described herein may be utilized without deviating from some embodiments.

The system 100 may comprise, for example, a casing 110 comprising a first inlet 112, a second inlet 114, and/or an outlet 116. The system 100 may also or alternatively comprise an impeller hub 120 and/or impeller blades 122. The system 100 may, for example, be or include a fan such as a blower fan. The impeller blades 122 (and/or the hub 120) may, for example, rotate and/or spin within the casing 110. In some configurations, fewer or more components than are shown in FIG. 1 may be included in the system 100. The casing 110 may comprise fewer or more inlets 112, 114 and/or outlets 116, for example.

In some configurations, the impeller blades 122 (and/or the hub 120) may spin within the casing 110. The spinning of the impeller blades 122 may, for example, cause air 130 to enter the inlets 112, 114. In other words, the impeller blades 122 may draw the air 130 into the casing 110. The spinning of the impeller blades 122 may also cause the air 132 to be expelled from the casing 110. The air 132 may be forced, for example, out through the outlet 116. In such a manner, the system 100 may function as a typical blower fan, drawing in air 130 axially (e.g., along the axis around which the impeller blades 122 and/or the hub 120 spin) and expelling it laterally and/or centrifugally.

Operation of the system 100 may, in some configurations, cause some air 134 to be expelled from the inlets 112, 114. The spinning of the impeller blades 122 within the casing 110 may, for example, cause areas of increased pressure within the casing 110. This increased pressure may, in some configurations, force some air 134 out of the inlets 112, 114. Other factors such as airflow eddies may also or alternatively contribute to and/or cause air 134 to be expelled out of one or more of the inlets 112, 114. This "backflow" air 134 may interfere with the air 130 entering the casing 110. The backflow air 134 may, for example, cause turbulence, friction, eddies, and/or other disturbances within the inlet flow of the air 130 entering the casing. The disturbance of the flow of the inlet air 130 may, in some configurations, reduce the efficiency and/or performance of the system 100.

By slowing down the flow of the inlet air 130, for example, the backflow air 134 may reduce the flowrate of air that the system 100 may provide and/or move. In other words, less air 132 may exit the outlet 116, and less air 132 may therefore be available to cool an electronic component (not shown in FIG. 1). In typical configurations, the more air 132 that the system 100 is able to direct toward an electrical component, the better the cooling effect will be. The backflow air 134 and/or the effect there from may, therefore, reduce the effectiveness of the system 100 to provide and/or facilitate cooling.

Figure 2A:
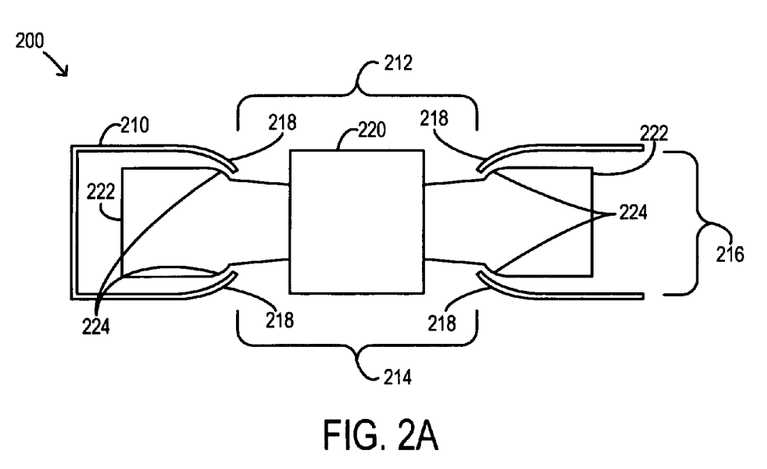
FIG. 2A is a cross-sectional diagram of a system according to some embodiments.

Turning to FIG. 2A, a cross-sectional diagram of a system 200 according to some embodiments is shown. The system 200 may comprise, for example, a casing 210 comprising a first inlet 212, a second inlet 214, an outlet 216, and/or a shaped portion 218. In some embodiments, a hub 220 and/or one or more impeller blades 222 may be disposed within the casing 210. The impeller blades 222 may, for example, be coupled to and/or integrated with the hub 220. According to some embodiments, the impeller blade 222 may comprise a shaped portion 224. In some embodiments, the components 210, 212, 214, 216, 220, 222 of the system 200 may be similar in configuration and/or functionality to the similarly-named components described in conjunction with FIG. 1. In some embodiments, fewer or more components than are shown in FIG. 2 may be included in the system 200.

According to some embodiments, the shaped portion 218 of the casing 210 may be configured to reduce the amount of backflow produced by the system 200. The shaped portion 218 may, for example, facilitate isolation of any higher pressure regions inside the casing 210 from the inlets 212, 214. The shaped portion 218 may also or alternatively block some and/or a substantial amount of backflow air by impeding the path that the air would normally take to exit the casing 210 via the inlets 212, 214. In some embodiments, the shaped portion 218 may be or include a tapered portion of the casing 210.

As shown in FIG. 2A for example, the shaped portion 218 may be a portion of the casing that is tapered toward the impeller blades 222. The taper of the shaped portion 218 may, for example, at least partially separate any higher pressure areas (e.g., near the tips of the impeller blades 222) from the air (not shown in FIG. 2A) entering the inlets 212, 214 and/or may at least partially block the flow of air directed toward the inlets 212, 214 (e.g., due to eddies and/or swirl caused by the impeller blades 222). At least because the higher pressure areas may cause and/or create backflow by forcing air from within the casing out through the inlets 212, 214, the shaped portion 218 may reduce and/or substantially eliminate backflow. In some embodiments, at least because airflow directed toward the inlets 212, 214 from within the casing 210 may disrupt inlet airflow, the shaped portion 218 may reduce and/or substantially eliminate such backflow. In some embodiments, the shaped portion 218 may form a funnel to both direct air into the inlets 212, 214 and to reduce the amount of backflow air that is able to escape the casing 210 via the inlets 212, 214.

In some embodiments, the impeller blades 222 may also or alternatively comprise the shaped portions 224. The shaped portions 224 of the impeller blades 222 may, for example, be shaped to substantially match the shaped portion 218 of the casing 210. According to some embodiments, the utilization of both of the shaped portions 218, 224 may further facilitate the prevention and/or reduction of backflow. Reducing the size of the air gap between the impeller blades 222 and the casing 210 may, for example, reduce the possibility (and/or amount of) of air being forced into the inlets 212, 214 to create backflow.

Figure 2B:
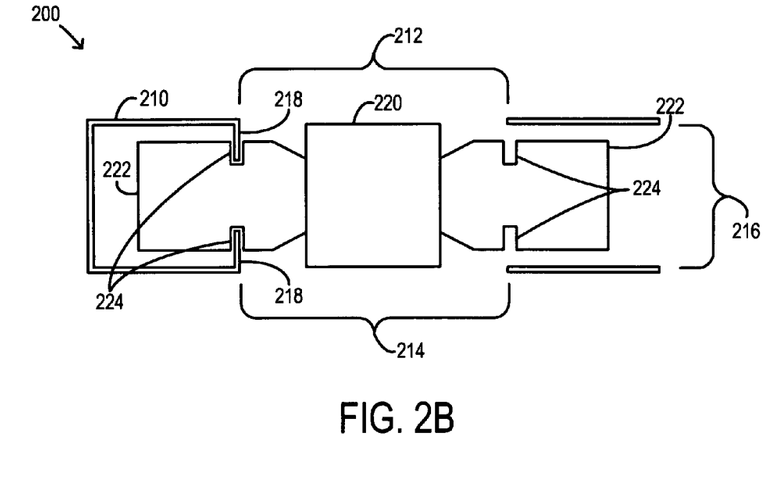
FIG. 2B is a cross-sectional diagram of a system according to some embodiments.

Referring now to FIG. 2B, a cross-sectional diagram of a system 200 according to some embodiments is shown. In some embodiments, the system 200 may be similar to the system 200 described in conjunction with FIG. 2A. The system 200 may, for example, be configured to more efficiently provide airflow for cooling by reducing backflow effects. The system 200 may comprise, in some embodiments, a casing 210 comprising a first inlet 212, a second inlet 214, an outlet 216, and/or a shaped portion 218. In some embodiments, a hub 220 and/or one or more impeller blades 222 may be disposed within the casing 210. According to some embodiments, the impeller blade 222 may comprise a shaped portion 224. In some embodiments, the components 210, 212, 214, 216, 218, 220, 222, 224 of the system 200 may be similar in configuration and/or functionality to the similarly-named and/or numbered components described in conjunction with FIG. 2A. In some embodiments, fewer or more components than are shown in FIG. 2B may be included in the system 200.

According to some embodiments, the shaped portion 218 of the casing 210 may be or include a lip or ridge (e.g., as shown in FIG. 2B) that extends into the casing 210. The shaped portion 218 may, for example, be a portion of the casing 210 that is angled into the path of the impeller blades 222. In some embodiments, the shaped portion 218 may extend into the shaped portion 224 of the impeller blades 222. The shaped portion 224 of the impeller blades 222 may, for example, be or include a groove, detent, and/or other feature that is configured to accept the shaped portion 218 of the casing 210. The shaped portion 224 of the impeller blades 222 may, for example, allow the shaped portion 218 of the casing 210 to extend into the path of the impeller blades 222 without inhibiting the rotation of the impeller blades 222. The shaped portion 224 of the impeller blades 222 may, according to some embodiments, form a groove and/or cutout in the impeller blades 222 through which the shaped portion 218 of the casing 210 may extend. The impeller blades 222 may then, for example, rotate within the casing and/or around the shaped portion 218 of the casing 210.

In some embodiments, the shaped portions 218, 224 may substantially prevent backflow from disrupting the flow of air into the inlets 212, 214. The shaped portions 218, 224 may, for example, substantially isolate areas of higher pressure within the casing 210 from the inlets 212, 214 (e.g., by creating a pressure wall). The shaped portions 218, 224 may also or alternatively substantially limit and/or prevent air within the casing 210 from being expelled via the inlets 212, 214. The extension of the shaped portion 218 of the casing 210 into the shaped portion 224 of the impeller blades 222 may, according to some embodiments, impede the flow of air from within the casing 210 toward the inlets 212, 214.

According to some embodiments, the shaped portion 218 of the casing 210 (e.g., in FIG. 2A and/or FIG. 2B) may extend around the circumference of the inlets 212, 214 (e.g., assuming circularly-shaped inlets 212, 214). In some embodiments, such as shown in FIG. 2B for example, the shaped portion 218 may extend along a portion of the inlets 212, 214. The shaped portion 218 may not extend along an area near the outlet 216, for example, to prevent disruption and/or impendence of the air exiting the casing 210 via the outlet 216. In some embodiments, the shaped portion 218 may comprise various lips, edges, and/or other surfaces that extend along and/or near one or more portions of the inlets 212, 214. The shaped portion 218 may, for example, comprise a series of lips that extend and are spaced along the circumference of the inlets 212, 214. In some embodiments, the shaped portion 218 may be or include a portion of a device coupled, attached, and/or adjacent to the casing 210 (e.g., a portion of a laptop chassis). According to some embodiments, various shapes and/or configurations of the shaped portions 218 may be utilized to limit and/or substantially reduce or prevent backflow.

Figure 3A:
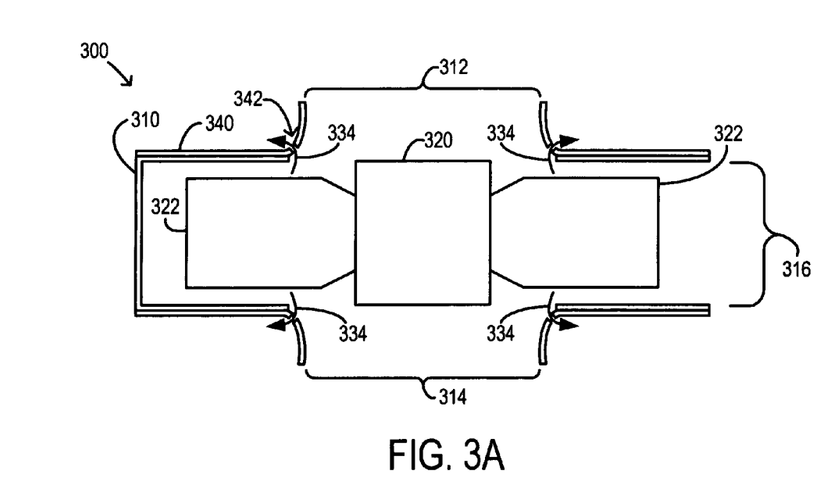
FIG. 3A is a cross-sectional diagram of a system according to some embodiments.

Turning now to FIG. 3A, a cross-sectional diagram of a system 300 according to some embodiments is shown. In some embodiments, the system 300 may be similar to the systems 200 described in conjunction with any of FIG. 2A and/or FIG. 2B. The system 300 may comprise, for example, a casing 310 comprising a first inlet 312, a second inlet 314, and/or an outlet 316. In some embodiments, a hub 320 and/or one or more impeller blades 322 may be disposed within the casing 310. According to some embodiments, backflow air 324 may be created by the system 300. The system 300 may also or alternatively comprise a device 340 defining one or more channels 334. In some embodiments, the components 310, 312, 314, 316, 320, 322 of the system 300 may be similar in configuration and/or functionality to the similarly-named and/or numbered components described in conjunction with any of FIG. 2A and/or FIG. 2B. In some embodiments, fewer or more components than are shown in FIG. 3A may be included in the system 300.

According to some embodiments, such as shown in FIG. 3A, the device 340 may be or include an inlet duct to facilitate direction of air into the inlets 312, 314. In some embodiments, the device 340 may be coupled to the casing 310 (e.g., using fasteners, adhesives, and/or other methods or devices). According to some embodiments, the device 340 may be or include a portion of the casing 310. The device 340 may, for example, be an protrusion and/or other feature integral to the casing 310. In some embodiments, the device 340 may simply be a portion of the casing 310 that extends away from the inlets 312, 314. According to some embodiments, the device 340 may be a portion of an object separate from the casing 310, such as a portion of a laptop computer chassis.

The channels 342 may, according to some embodiments, allow the backflow air 334 to exit the casing 310 without substantially interfering with the flow of air into the inlets 312, 314. The channels 342 may, for example, provide an outlet for the backflow air 334 that is located toward the periphery of the inlet airflow, reducing the amount of inlet air that may be influenced by the backflow air 334. In some embodiments, the channels 342 may simply be or include a gap between the device 340 and the casing 310. The gap may, for example, be a gap extending at least partially around the base of the inlet duct defined by the device 340. According to some embodiments, the channels 342 may also or alternatively comprise one or more holes. The device 340 may, for example, comprise one or more holes defining the channels 342. Other configurations of the device 340 and/or the channels 342 may also or alternatively be utilized to limit the effect of backflow in the system 300.

Figure 3B:
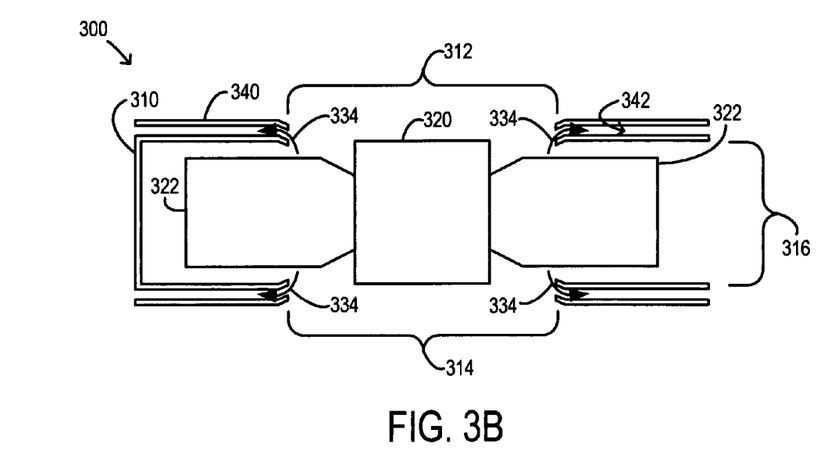
FIG. 3B is a cross-sectional diagram of a system according to some embodiments.

Turning to FIG. 3B for example, a cross-sectional diagram of a system 300 according to some embodiments is shown. In some embodiments, the system 300 may be similar to the system 300 described in conjunction with FIG. 3A. The system 300 may comprise, for example, a casing 310 comprising a first inlet 312, a second inlet 314, and/or an outlet 316. In some embodiments, a hub 320 and/or one or more impeller blades 322 may be disposed within the casing 310. According to some embodiments, backflow air 324 may be created by the system 300. The system 300 may also or alternatively comprise a device 340 defining one or more channels 334. In some embodiments, the components 310, 312, 314, 316, 320, 322, 334, 340, 342 of the system 300 may be similar in configuration and/or functionality to the similarly-named and/or numbered components described in conjunction with any of FIG. 2A, FIG. 2B, and/or FIG. 3A. In some embodiments, fewer or more components than are shown in FIG. 3B may be included in the system 300.

The channels 342 may, as shown in FIG. 3B, be defined by the positioning of the device 340 with respect to the casing 310. In some embodiments, the device 340 may be a portion of the casing 310. The device 340 may, for example, be an outer wall of a double-walled casing 310. The outer wall device 340 may be spaced from the inner wall of the casing 310, defining an area between the two walls. The area may, for example, be or include paths extending from one or more of the inlets 312, 314 to one or more locations outside of the casing 310. As shown in FIG. 3B, the paths may function as channels 342 to permit the backflow air 334 to be directed out of the casing 310 via a route other than the inlets 312, 314. In other words, the channels 342 may facilitate and/or cause the backflow air 334 to exit the casing 310 without substantially interfering with the flow of air into the inlets 312,314.

In some embodiments, the edges of the casing 310 and/or the device 340 may be beveled and/or tapered to direct the backflow air 334 into the channels 342 and/or to otherwise facilitate separation of the backflow air 334 from the inlet airflow. The tapered portions of the casing 310 and/or the device 340 may, for example, be similar in configuration and/or functionality to the shaped portions 218 of the casing 210 described in conjunction with FIG. 2A and/or FIG. 2B. In some embodiments, other methods and/or devices may be utilized to form the channels 342 and/or to direct the backflow air 334 into the channels 342. The device 340 may, according to some embodiments, be separate from and/or attached to the casing 310. The device 340 may, for example, comprise one or more pieces and/or portions that define one or more discrete channels 342 along the upper (and/or lower) surfaces of the casing 310. In some embodiments, the device 340 may also or alternatively comprise one or more pipes, tubes, conduits, and/or other components that define and/or are otherwise associated with the channels 342.

Figure 4A:
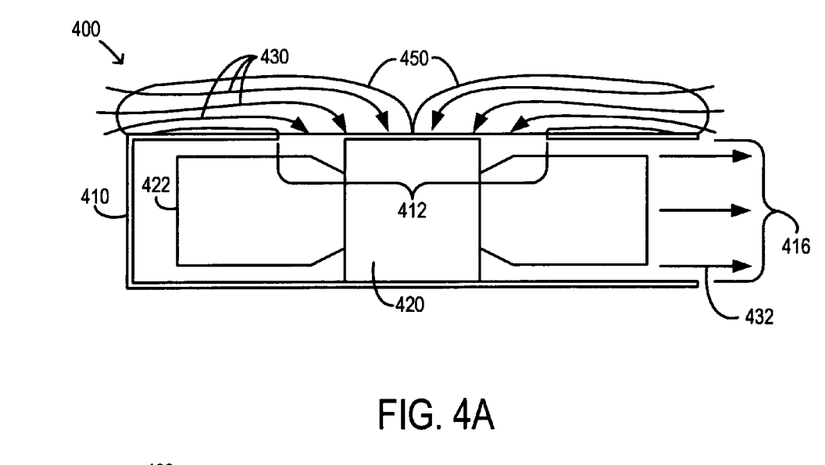
FIG. 4A is a cross-sectional diagram of a system according to some embodiments.

Referring now to FIG. 4A, a cross-sectional diagram of a system 400 according to some embodiments is shown. In some embodiments, the system 400 may be similar to the systems 200, 300 described in conjunction with any of FIG. 2A, FIG. 2B, FIG. 3A, and/or FIG. 3B. The system 400 may comprise, for example, a casing 410 comprising an inlet 412 and/or an outlet 416. In some embodiments, a hub 420 and/or one or more impeller blades 422 may be disposed within the casing 410. According to some embodiments, inflow air 430 may enter the casing 410 via the inlet 412 and/or outlet air 432 may exit the casing 410 via the outlet 416. The system 400 may also or alternatively comprise one or more vanes 450. In some embodiments, the components 410, 412, 416, 420, 422, 430, 432 of the system 400 may be similar in configuration and/or functionality to the similarly-named and/or numbered components described in conjunction with any of FIG. 2A, FIG. 2B, FIG. 3A, and/or FIG. 3B. In some embodiments, fewer or more components than are shown in FIG. 4A may be included in the system 400.

The system 400 may, for example, be a blower fan with a single inlet 412 and/or a single outlet 416. In some embodiments, more inlets 412 and/or outlets 416 may be defined by and/or included in the system 400. According to some embodiments, the impeller blades 422 may spin within the casing 410 to draw the inlet air 430 into the inlet 412. The inlet air 430 may, for example, be drawn into the inlet 412, into the casing 410, and then may be expelled as the outlet air 432 via the outlet 416. In some embodiments, backflow effects may limit the efficiency and/or performance of the system 400. Backflow may also or alternatively increase acoustic levels associated with operation of the system 400.

The vanes 450 may, according to some embodiments, be included in the system 400 to direct the inlet air 430 into the inlet 412. The vanes 450 may be shaped, for example, to direct the inlet air 430 in a substantially smooth and/or uninterrupted fashion into the inlet 412. The direction of the inlet air 430 may, for example, reduce backflow effects. In some embodiments, such as in the case that the system 400 is disposed between two objects and/or is otherwise exposed to a low head space condition (e.g., in a notebook and/or portable computer), for example, the vanes 450 may manage the inlet airflow 430 to reduce turbulence, eddies, and/or other flows that would impede the inlet airflow 430. In some embodiments, the backflow from the casing 410 may similarly be reduced and/or eliminated by disrupting any swirl components of the backflow. In other words, the vanes 450 may impede airflow along the edge of the inlet 412, of which backflow may be a significant component.

The vanes 450 may be configured in any fashion that is or becomes known or practicable. One or more vanes 450 may be coupled to the casing 410, for example, in any configuration that directs the inlet air 430 toward the inlet 412 and/or that otherwise reduces backflow from the casing 410. The vanes 450 may be or include, in some embodiments, one or more separate pieces or components attached to the casing 410. According to some embodiments, the vanes 450 may be part of and/or otherwise integrated with the casing 410. The vanes 450 may, for example, be or include one or more protrusions, ridges, lips, and/or other features of the casing 410. In some embodiments, the vanes 450 may simply be adjacent and/or near the inlet 412. In the case that the system 400 is a blower fan in a laptop computer (not shown), for example, the vanes 450 may be features of the laptop that are located in proximity to the inlet 412. When the system 400 is installed in the laptop, for example, the vanes 450 may be features of the chassis of the laptop and/or of another component within the laptop that direct the inlet airflow 430 toward the inlet 412.

Figure 4B:
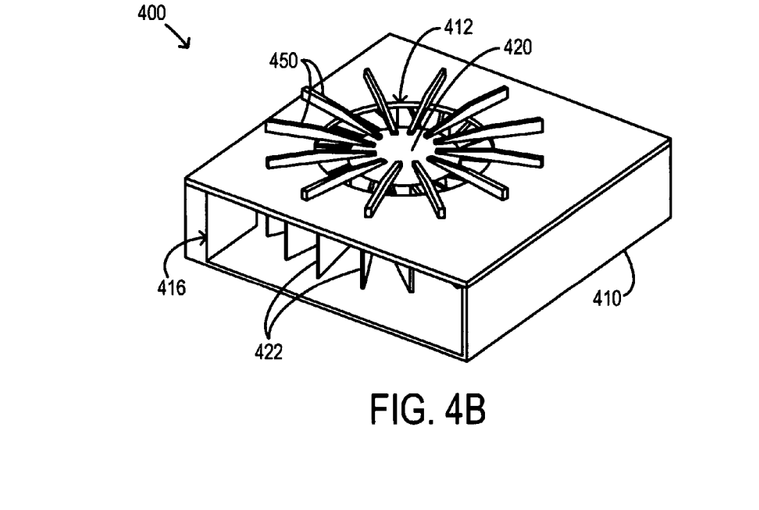
FIG. 4B is a perspective diagram of a system according to some embodiments.

Turning to FIG. 4B, a perspective diagram of a system 400 according to some embodiments is shown. In some embodiments, the system 400 may be similar to the systems 200, 300, 400 described in conjunction with any of FIG. 2A, FIG. 2B, FIG. 3A, FIG. 3B, and/or FIG. 4A. The system 400 may comprise, for example, a casing 410 comprising an inlet 412 and/or an outlet 416. In some embodiments, a hub 420 and/or one or more impeller blades 422 may be disposed within the casing 410. The system 400 may also or alternatively comprise one or more vanes 450. In some embodiments, the components 410, 412, 416, 420, 422, 450 of the system 400 may be similar in configuration and/or functionality to the similarly-named and/or numbered components described in conjunction with any of FIG. 2A, FIG. 2B, FIG. 3A, FIG. 3B, and/or FIG. 4A. In some embodiments, fewer or more components than are shown in FIG. 4B may be included in the system 400.

In some embodiments, such as shown in FIG. 4B, the vanes 450 may be arranged in a substantially circular pattern along the circumference of the inlet 412. The vanes 450 may, for example, extend from areas of the casing 410 near the periphery of the inlet 412 to an area near the center of the inlet 412. The vanes 450 may, according to some embodiments, direct air from around the outside of and/or above the casing 410 in a radial fashion toward the center of the inlet 412. The vanes 450 may, in some embodiments, reduce backflow effects be reducing turbulence in the area in and/or around the inlet 412. Any swirl components of airflow emanating from within the casing 410 (e.g., due to the spinning of the impeller blades 422), for example, may be substantially impeded by the vanes 450. Backflow directed around the circumference of the inlet 412, for example, may encounter the sides of the vanes 450, substantially preventing the backflow from establishing turbulent flow patterns in the area around and/or along the inlet 412.

Other configurations of the vanes 450 may be utilized without deviating from some embodiments. According to some embodiments for example, multiple layers and/or configurations of vanes 450 may be utilized to direct the air into the inlet 412. The vanes 450 may extend further away from the inlet 412 than is shown in FIG. 4B and/or the vanes 450 may be shaped to capture and/or direct air as desired. In some embodiments, the vanes 450 may be substantially conically-shaped to more smoothly direct air from around the casing 410 into the inlet 412 and/or to better reduce and/or capture the swirl components of the backflow.

Figure 5A:
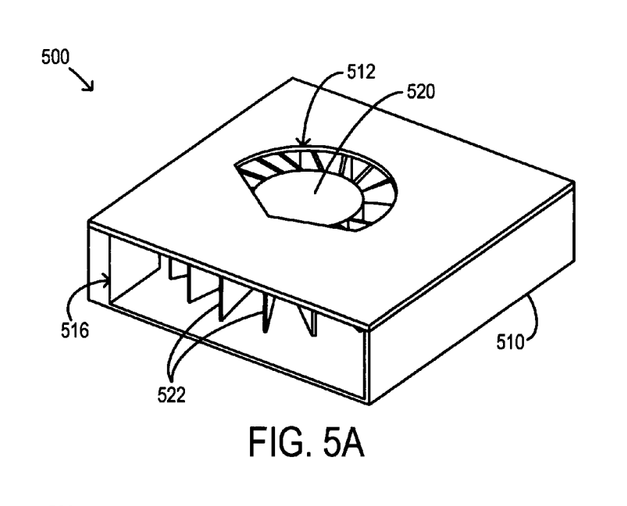
FIG. 5A is a perspective diagram of a system according to some embodiments.
Figure 5B:
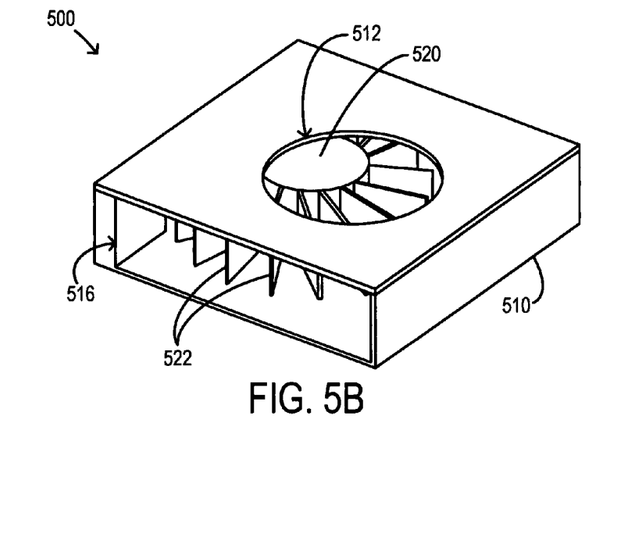
FIG. 5B is a perspective diagram of a system according to some embodiments.

Referring now to FIG. 5A and FIG. 5B, perspective diagrams of systems 500 according to some embodiments are shown. In some embodiments, the systems 500 may be similar to the systems 200, 300, 400 described in conjunction with any of FIG. 2A, FIG. 2B, FIG. 3A, FIG. 3B, FIG. 4A, and/or FIG. 4B. The system 500 may comprise, for example, a casing 510 comprising an inlet opening 512 and/or an outlet 516. In some embodiments, a hub 520 and/or one or more impeller blades 522 may be disposed within the casing 510. In some embodiments, the components 510, 512, 516, 520, 522 of the system 500 may be similar in configuration and/or functionality to the similarly-named and/or numbered components described in conjunction with any of FIG. 2A, FIG. 2B, FIG. 3A, FIG. 3B, FIG. 4A, and/or FIG. 4B. In some embodiments, fewer or more components than are shown in FIG. 5A and/or FIG. 5B may be included in the system 500.

In some embodiments, the shape of the inlet opening 412 may be modified to reduce backflow effects. While a typical blower fan opening may be substantially circularly-shaped and centered on the axis about which the hub 520 and/or the impeller blades 522 spin, for example, the inlet opening 512 of the system 500 may be a different shape and/or configuration to reduce backflow effects. The centered and circularly-shaped inlet of typical blower fans may function well in free-stream (e.g., test or laboratory) conditions, for example, yet may exhibit backflow problems in many environments and/or conditions, such as when installed in a computing device (e.g., a laptop computer). The inlet opening 512 may, in some embodiments, be shaped to reduce the effects and/or occurrences of backflow in various applications of the system 500.

In the case that the system 500 is installed in a mobile computing device with low head space above the inlet opening 512, for example, the inlet opening 512 may be at least partially non-circular to reduce backflow effects. Providing a partially non-circular inlet opening 512 may, according to some embodiments, impede the flow of backflow air around the inlet opening 512. In some embodiments, the non-circular portion and/or portions of the inlet opening 512 may be positioned over portions of the casing that are known and/or expected to produce backflow and/or substantial amounts thereof.

According to some embodiments, the shaping of the inlet opening 512 may be accomplished through a variety of means. The inlet opening 512 itself may, as shown in FIG. 5A for example, be cut out (and/or molded or otherwise formed) of the casing 510 to form a shape that is at least partially non-circular. In some embodiments, a device may be installed and/or coupled to the casing 510 to alter the shape of the inlet opening 512. Any number and/or configuration of objects may, for example, be adhered, fastened, and/or otherwise attached to the casing 510 to cover one or more portions of the inlet opening 512. In the case that the system 500 is installed in a particular environment, for example, the area and/or areas of the casing that produce backflow and/or substantial amounts of and/or all of the backflow may be determined and then covered to limit and/or substantially eliminate backflow effects.

In some embodiments, such as shown in FIG. 5B, the inlet opening 512 may be substantially circularly-shaped, yet may be offset from and/or eccentric to the axis about which the hub 520 and/or the impeller vanes 522 rotate. The offset of the circular inlet opening 512 may, for example, reduce backflow effects. According to some embodiments, the inlet opening 512 may be offset away from an area within the casing 510 that is known and/or suspected of producing backflow. The inlet opening 512 may be offset away from an area within the casing 510 that is associated with a higher pressure within the casing, for example, to reduce the possibility that the higher pressure will cause backflow that may interfere with the inlet airflow.

Figure 6:
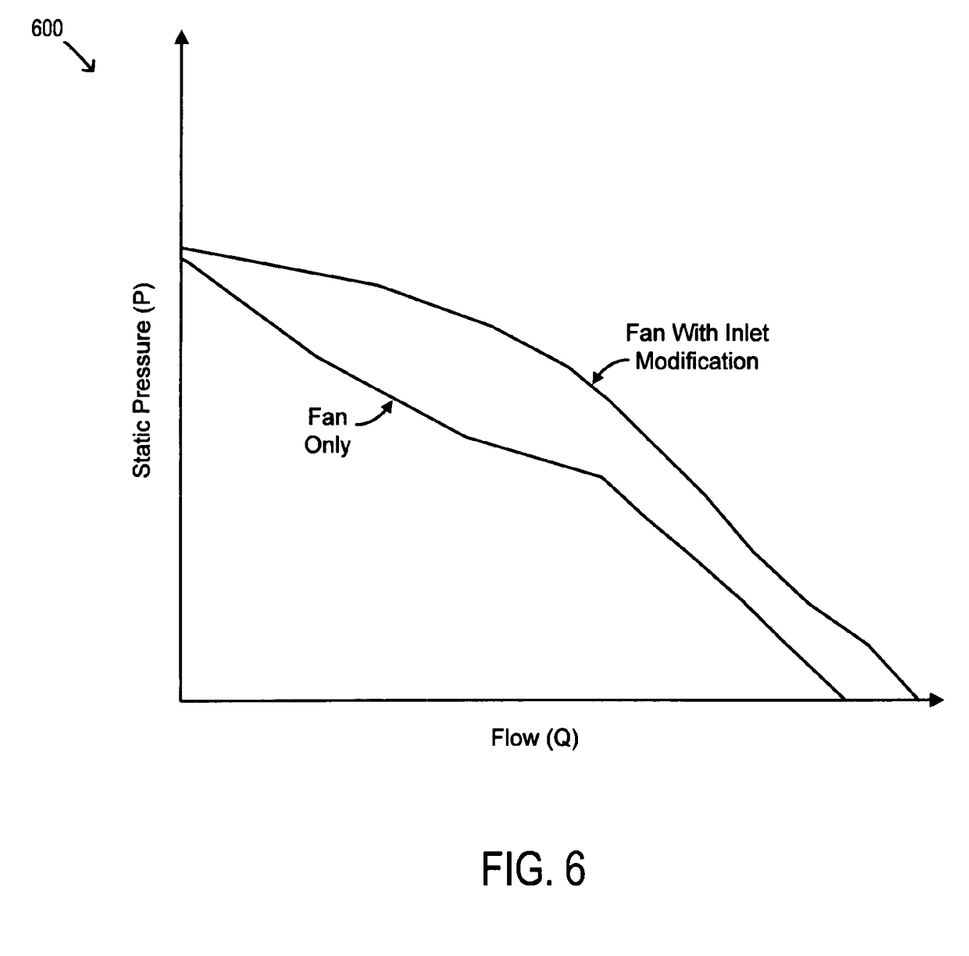
FIG. 6 is a graph illustrating improvement in a system according to some embodiments.

Turning now to FIG. 6, a graph 600 illustrating improvement in a system according to some embodiments is shown. In some embodiments, the graph 600 may illustrate improvement in one of the systems 200, 300, 400, 500 described in conjunction with any of FIG. 2A, FIG. 2B, FIG. 3A, FIG. 3B, FIG. 4A, FIG. 4B, FIG. 5A, and/or FIG. 5B herein. For example, the graph 600 may illustrate the difference between a typical blower fan and a blower fan with an inlet modified in accordance with one or more of the embodiments described herein. According to some embodiments, a blower fan with a modified inlet may operate more efficiently and/or perform better than a typical blower fan. Reduction and/or elimination of backflow may also or alternatively reduce acoustic noise levels associated with operation of a blower fan with a modified inlet.

In the case that a typical blower fan and a modified inlet blower fan are installed in a mobile computing device (and/or in similar mobile computing devices), for example, the graph 600 may illustrate the improved performance of the blower fan with the modified inlet. For example, at a particular static pressure ("P"), the modified inlet blower fan may be capable of passing a higher flowrate ("Q") of air than a typical blower fan. The reduction in backflow effects caused by the inlet modification may, for example, increase the performance and/or efficiency of the blower fan (and/or reduce acoustic noise levels). In some embodiments, the increased efficiency of the blower fan may allow more heat to be removed from electronic components and/or from the mobile computing device itself. According to some embodiments, the inlet modification may provide greater efficiency and/or performance effects at certain levels of static pressure. The inlet modification may be configured, for example, to provide greater effects in a range of pressures typically experience during operating conditions of the blower fan within the portable computing device.

The graph 600 is exemplary of improvement obtained by altering the inlet geometry (e.g., utilizing a partially non-circular inlet opening) as compared to typical blower fans, in a simulated installed environment. The graph 600 is depicted for use in explanation, but not limitation, of described embodiments. Other types, quantities, and/or magnitudes of improvement may be obtained utilizing different fans, different inlet modifications, and/or different environments. According to some embodiments, utilizing a combination of inlet modification techniques described herein may, for example, increase the improvement in performance in relation to typical blower fans.

Figure 7:
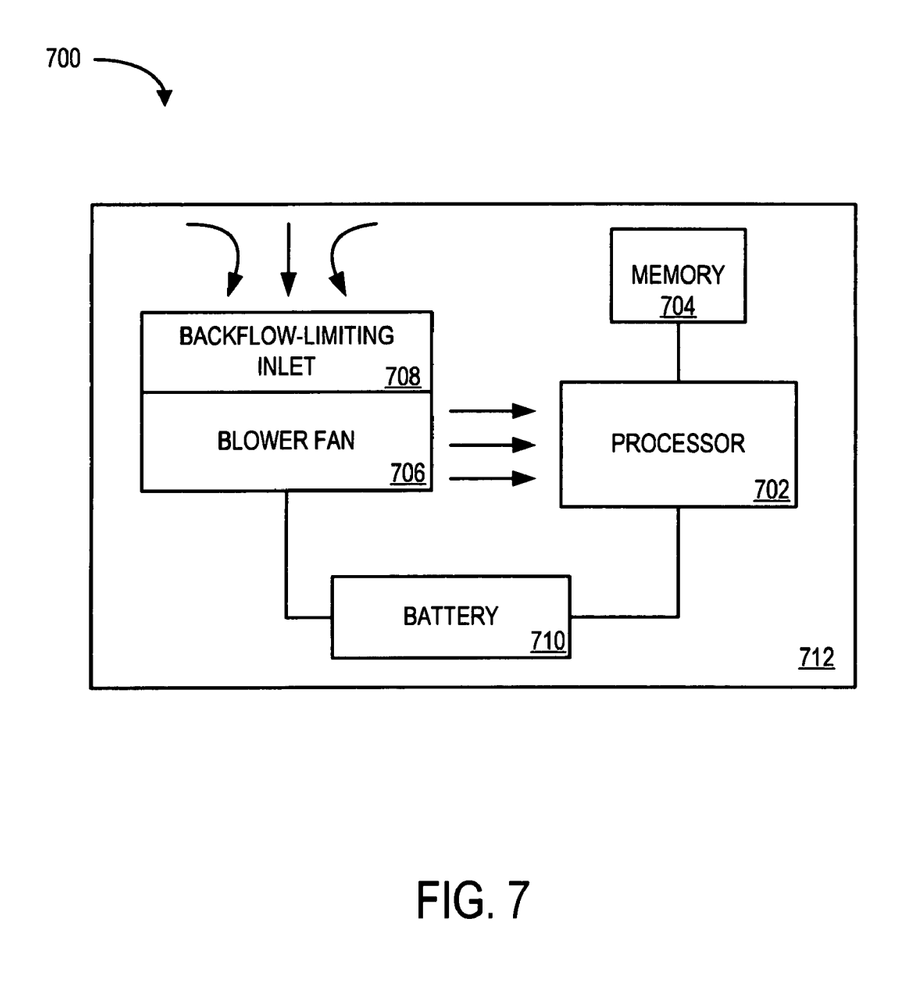
FIG. 7 is a block diagram of a system according to some embodiments.

Referring now to FIG. 7, a block diagram of a system 700 according to some embodiments is shown. In some embodiments, the system 700 may be similar to the systems 200, 300, 400, 500 described in conjunction with any of FIG. 2A, FIG. 2B, FIG. 3A, FIG. 3B, FIG. 4A, FIG. 4B, FIG. 5A, and/or FIG. 5B. The system 700 may comprise, for example, a processor 702, a memory 704, a blower fan 706 with a backflow-limiting inlet 708, and/or a battery 710. The components 702, 704, 706, 708, 710 of the system 700 may, in some embodiments, be housed within and/or otherwise associated with an electronic device 712 (e.g., a Personal Digital Assistant (PDA), laptop computer, and/or Personal Computer (PC)). According to some embodiments, the components 706, 708 of the system 700 may be similar in configuration and/or functionality to the similarly-named components described in conjunction with any of FIG. 2A, FIG. 2B, FIG. 3A, FIG. 3B, FIG. 4A, FIG. 4B, FIG. 5A, and/or FIG. 5B. In some embodiments, fewer or more components than are shown in FIG. 7 may be included in the system 700.

The processor 702 may be or include any number of processors, which may be any type or configuration of processor, microprocessor, and/or micro-engine that is or becomes known or available. In some embodiments, other electronic and/or electrical devices may be utilized in place of or in addition to the processor 702. The processor 702 may, for example, be or include any device, object, and/or component that generates, stores, and/or requires removal of heat. In some embodiments, the processor 702 may comprise one or more components of a cooling solution to cool the processor 702. The components may include, for example, a heat spreader (such as an Integrated Heat Spreader (IHS), a heat sink and/or fins thereof, a heat pipe, and/or other cooling components.

According to some embodiments, the processor 702 may be an XScale® Processor such as an Intel® PXA270 XScale® processor. The memory 704 may be or include, according to some embodiments, one or more magnetic storage devices, such as hard disks, one or more optical storage devices, and/or solid state storage. The memory 704 may store, for example, applications, programs, procedures, and/or modules that store instructions to be executed by the processor 702. The memory 704 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

In some embodiments, the blower fan 706 may be utilized to direct air (and/or another fluid) toward the processor 702 and/or other components associated with the processor (e.g., cooling solution components). The blower fan 706 may, for example, direct air toward the processor 702 to facilitate cooling of the processor 702. According to some embodiments, the blower fan 706 may also or alternatively direct air out of the electronic device 712 (not shown). According to some embodiments, the processor 702 and/or the blower fan 706 may be powered by the battery 710. The battery 710 may, for example, be any type or configuration of battery that is or becomes capable of powering the electronic device 712.

According to some embodiments, the backflow-limiting inlet 708 may be a system and/or device configured to prevent and/or reduce backflow in accordance with one or more of the embodiments described herein. The backflow-limiting inlet 708 may, for example, comprise one or more vanes to direct air into the inlet of the blower fan 706 (e.g., in accordance with the system 400). The backflow-limiting inlet 708 may also or alternatively comprise and/or define one or more channels through which backflow may escape the blower fan 706 without substantially interfering with the inlet airflow (e.g., in accordance with the system 300). According to some embodiments, the backflow-limiting inlet 708 may comprise a portion of the casing of the blower fan 706 that is configured to reduce backflow. The portion of the casing may, for example, be bent to form a lip and/or tapered toward the impeller blades to reduce the occurrence and/or possibility of occurrence of backflow (e.g., in accordance with the system 200). The backflow-limiting inlet 708 may also or alternatively comprise an inlet opening to the blower fan 706 that is at least partially non-circularly-shaped and/or is offset from the axis about which the impeller of the blower fan 706 spins (e.g., in accordance with the system 500).

In some embodiments, the backflow-limiting inlet 708 may be a portion and/or part of the blower fan 706. According to some embodiments, the backflow-limiting inlet 708 may be a device coupled and/or attached to the blower fan 706. The backflow-limiting inlet 708 may also or alternatively comprise a device and/or portion thereof that is in proximity to the blower fan 706. The backflow-limiting inlet 708 may, for example, comprise a portion of the electronic device 712 such as a portion of the chassis of the electronic device 712. In some embodiments, such as in the case that the blower fan 706 comprises more than one inlet, the backflow-limiting inlet 708 may be associated with each inlet that the blower fan comprises. In some embodiments, multiple backflow-limiting inlets 708 may be utilized. In the case that multiple backflow-limiting inlets 708 are utilized, the backflow-limiting inlets 708 may function via the same or differing backflow-limiting strategies (e.g., as described herein). According to some embodiments, the backflow-limiting inlet 708 may increase the efficiency and/or performance of the blower fan 706, and/or may reduce noise levels in the electronic device 712.

The several embodiments described herein are solely for the purpose of illustration. Those skilled in the art will note that various substitutions may be made to those embodiments described herein without departing from the spirit and scope of the present invention. Those skilled in the art will also recognize from this description that other embodiments may be practiced with modifications and alterations limited only by the claims.

What is claimed is:

1. A system, comprising:
    a casing comprising:
        an inlet defining portion defining an inlet to accept a fluid; and
        an outlet defining portion defining an outlet to evacuate the fluid; and
    an impeller disposed within the casing, comprising:
        a hub; and
        a plurality of impeller blades coupled to the hub, each impeller blade having an outer edge opposite the hub and an upper edge proximate the inlet;
    wherein each of the plurality of impeller blades comprises a tapered portion coupled to the hub, wherein a height of the outer edge is higher than a height of the tapered portion, wherein the casing defines an opening for the plurality of impeller blades, and wherein a portion of each of the plurality of impeller blades includes a notch shaped portion, and wherein a substantially perpendicular section of the casing extends into the notch shaped portion, to reduce the amount of fluid that evacuates the casing via the inlet due to pressure within the casing.

2. The system of claim 1, wherein each impeller blade top edge defines a groove into which the inlet defining portion extends.

3. The system of claim 1, wherein the inlet defining portion is tapered toward the impeller blades.

4. The system of claim 3, wherein the top edges of the impeller blades are tapered to match the taper of the inlet defining portion.

5. A system, comprising:
    a casing comprising:
        an inlet to accept a fluid; and
        an outlet to evacuate the fluid;
    an impeller disposed within the casing, comprising:
        a hub; and
        one or more impeller blades coupled to the hub; and
    one or more vanes outside the casing and coupled to and extending away from an outer surface of a wall of the casing to direct the fluid into the inlet of the casing, wherein the outer surface of a wall of the casing is disposed between the one or more vanes and the impeller, and wherein a portion of at least one of the one or more vanes is positioned above the hub.

6. The system of claim 5, wherein the one or more vanes are shaped to direct the fluid into the inlet without substantially disrupting the flow of the fluid.

7. The system of claim 5, wherein the inlet includes an inlet opening shaped to reduce backflow.

8. The system of claim 7, wherein the inlet opening is at least partially non-circularly-shaped.

9. The system of claim 7, wherein the inlet opening is substantially circularly-shaped and is positioned eccentrically in relation to the hub.

10. The system of claim 5, wherein the system is a notebook computer.

11. The system of claim 1, wherein the tapered portion has a greater height than the opening.

12. The system of claim 1, wherein the casing comprises a single outlet.

13. The system of claim 5, wherein the casing comprises a single outlet.

* * * * *